United States Patent
Oshima (10) Patent No.: US 9,902,424 B2
(45) Date of Patent: Feb. 27, 2018

(54) METHOD FOR CONTROLLING ELECTRIC POWER STEERING APPARATUS, ELECTRIC POWER STEERING APPARATUS AND VEHICLE EQUIPPED WITH THE SAME

(71) Applicant: NSK LTD., Tokyo (JP)

(72) Inventor: Atsushi Oshima, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/500,335

(22) PCT Filed: Oct. 8, 2015

(86) PCT No.: PCT/JP2015/078577
§ 371 (c)(1),
(2) Date: Jan. 30, 2017

(87) PCT Pub. No.: WO2016/056616
PCT Pub. Date: Apr. 14, 2016

(65) Prior Publication Data
US 2017/0217485 A1    Aug. 3, 2017

(30) Foreign Application Priority Data

Oct. 9, 2014  (JP) ................................ 2014-208351

(51) Int. Cl.
*A01B 69/00* (2006.01)
*B62D 6/00* (2006.01)
(Continued)

(52) U.S. Cl.
CPC .......... *B62D 6/002* (2013.01); *B62D 5/0457* (2013.01); *B62D 15/02* (2013.01); *F16H 1/16* (2013.01)

(58) Field of Classification Search
USPC .................................................. 701/41–44
See application file for complete search history.

(56) References Cited

U.S. PATENT DOCUMENTS 5,261,503 A    11/1993 Yasui
2010/0211263 A1*  8/2010 Lindenstruth ........ B62D 5/0472
                                                      701/41
(Continued)

FOREIGN PATENT DOCUMENTS

JP    06-199244 A    7/1994
JP    2002-160653 A    6/2002
(Continued)

OTHER PUBLICATIONS

International Search Report for PCT/JP2015/078577 dated Dec. 22, 2015 [PCT/ISA/210].
Written Opinion for PCT/JP2015/078577 dated Dec. 22, 2015 [PCT/ISA/237].
Notice of Allowance for JP 2014-208351 dated Sep. 27, 2016.
Office Action for JP 2014-208351 dated Jul. 5, 2016.

*Primary Examiner* — Lail A Kleinman
(74) *Attorney, Agent, or Firm* — Sughrue Mion, PLLC (57) ABSTRACT

A method for controlling an electric power steering apparatus, the electric power steering apparatus and a vehicle equipped with the same. The method includes detecting an upper-side angle of a torsion bar; detecting a lower-side angle; setting an angle target value of an opposite side by using one of the upper-side angle or the lower-side angle; detecting an actual angle of the opposite side; and performing an angle follow-up feedback control based on a deviation between the angle target value and the actual angle.

17 Claims, 5 Drawing Sheets

(51) Int. Cl.
*B62D 11/00* (2006.01)
*B62D 12/00* (2006.01)
*B63G 8/20* (2006.01)
*B63H 25/04* (2006.01)
*G05D 1/00* (2006.01)
*G06F 7/00* (2006.01)
*G06F 17/00* (2006.01)
*B62D 5/04* (2006.01)
*B62D 15/02* (2006.01)
*F16H 1/16* (2006.01)

(56) References Cited

U.S. PATENT DOCUMENTS

2012/0029783 A1* 2/2012 Takenaka ............... B60T 8/172
 701/73
2014/0303850 A1* 10/2014 Chai ..................... B62D 6/008
 701/42

FOREIGN PATENT DOCUMENTS

| JP | 2004-203089 A | 7/2004 |
| JP | 2005-067429 A | 3/2005 |
| JP | 2007-008242 A | 1/2007 |
| JP | 4196831 B2 | 12/2008 |
| JP | 2009-057017 A | 3/2009 |
| JP | 2010-173375 A | 8/2010 |
| JP | 2013-091443 A | 5/2013 |

* cited by examiner

FIG.1

PRIOR ART

METHOD FOR CONTROLLING ELECTRIC POWER STEERING APPARATUS, ELECTRIC POWER STEERING APPARATUS AND VEHICLE EQUIPPED WITH THE SAME

CROSS REFERENCE TO RELATED APPLICATIONS

This application is a National Stage of International Application No. PCT/JP2015/078577 filed Oct. 8, 2015, claiming priority based on Japanese Patent Application No. 2014-208351 filed Oct. 9, 2014, the contents of all which are incorporated herein by reference in their entirety.

TECHNICAL FIELD

The present invention relates to a method for controlling an electric power steering apparatus, wherein an assist-control is separated into a target angle calculating section and an angle follow-up control section, an item on a feeling is performed by the target angle calculating section, and controls on a responsibility, a stability and a suppression of external disturbance are performed by the angle follow-up control section, and to the electric power steering apparatus and a vehicle equipped with the above apparatus.

BACKGROUND ART

An electric power steering apparatus (EPS) serves as an apparatus which is equipped with a motor control unit to control a motor. The electric power steering apparatus which provides a steering mechanism of a vehicle with a steering assist torque (an assist torque) by means of a rotational torque of the motor, applies a driving force of the motor being controlled with an electric power supplied from an inverter to a steering shaft or a rack shaft by means of a transmission mechanism including a reduction mechanism.

In order to accurately generate the steering assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a pulse width modulation (PWM) control. A brushless motor, which has an excellent maintenance performance, is generally used as the motor.

Figure 1:
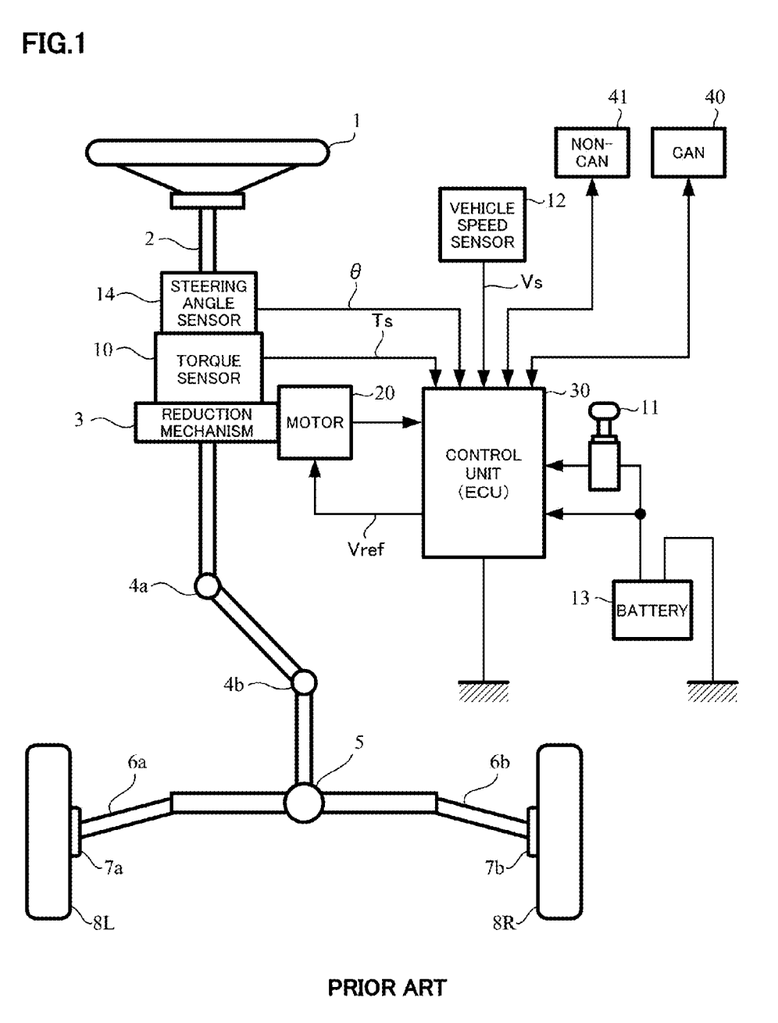
FIG. 1 is a schematic structural diagram of a conventional electric power steering apparatus.

A general configuration of the conventional electric power steering apparatus will be described with reference to FIG. 1. As shown in FIG. 1, a column shaft (a steering shaft, a handle shaft) 2 connected to a steering wheel (handle) 1, is connected to steered wheels 8L and 8R through a reduction mechanism (an engagement mechanism of a worm and a worm wheel) 3, universal joints 4a and 4b, a rack and pinion mechanism 5, and tie rods 6a and 6b, further via hub units 7a and 7b. Further, the column shaft 2 having a torsion bar are provided with a torque sensor 10 for detecting a steering torque Ts of the steering wheel 1 and a steering angle sensor 14 for detecting a steering angle θ, and a motor 20 for assisting the steering force of the steering wheel 1 is connected to the column shaft 2 through the reduction mechanism 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (steering assist) based on a steering torque Ts detected by the torque sensor 10 and a vehicle speed Vs detected by a vehicle speed sensor 12, and controls a current supplied to the motor 20 for EPS based on a voltage control command value Vref obtained by performing compensation and so on with respect to the current command value.

Besides, a steering angle sensor 14 is not indispensable and may not be provided. It is possible to obtain the steering angle θ from a rotational position sensor such as a resolver connected to the motor 20.

A controller area network (CAN) 40 to send/receive various information and signals on the vehicle is connected to the control unit 30, and it is also possible to receive the vehicle speed Vs from the CAN 40. Further, a Non-CAN 41 is also possible to connect to the control unit 30, and the Non-CAN 41 sends and receives a communication, analogue/digital signals, electric wave or the like except for the CAN 40. The control unit 30 includes a control board mounted electronic parts or the like.

Figure 2:
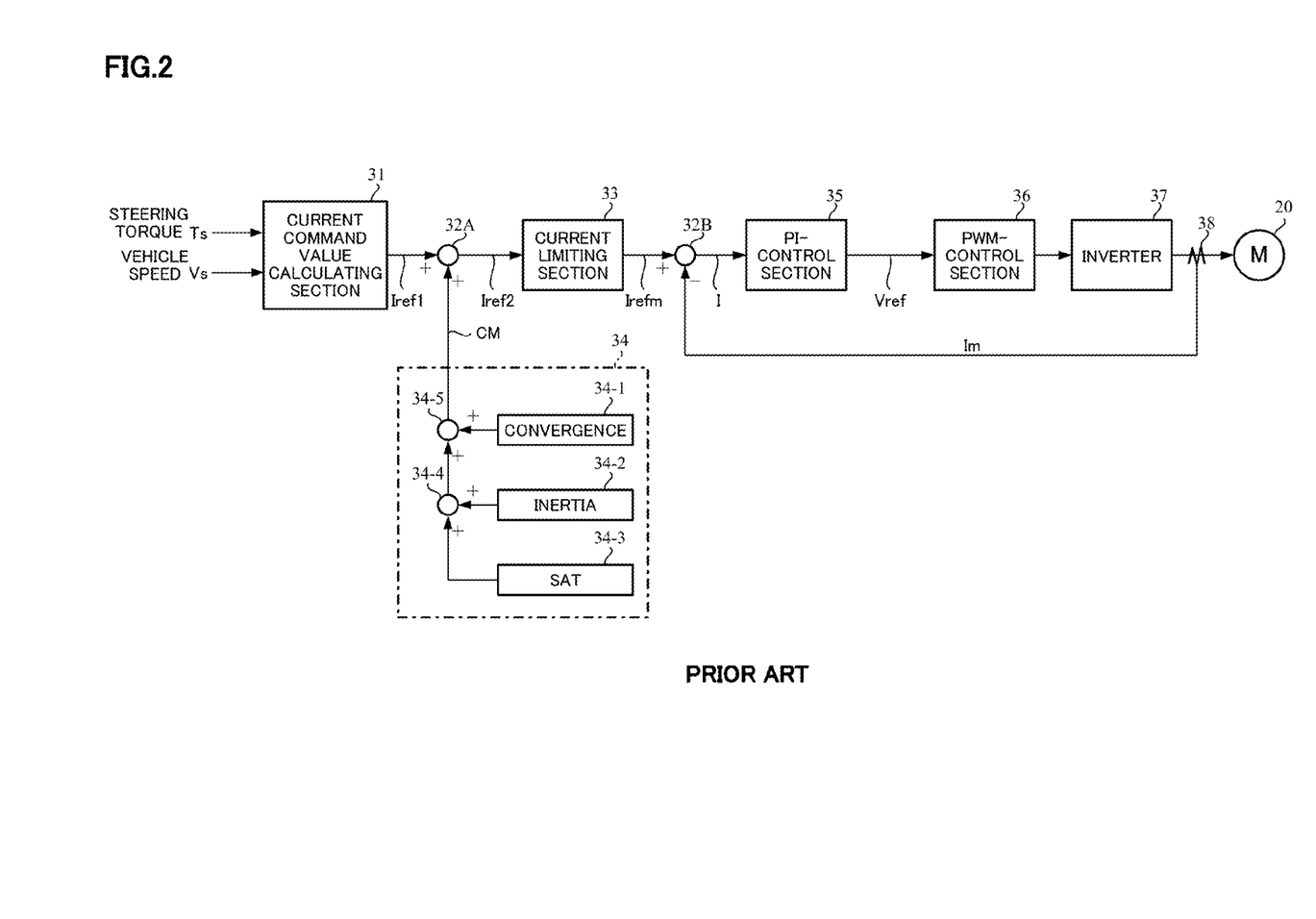
FIG. 2 is a block diagram showing an example of a control structure of a control unit (ECU) of the electric power steering apparatus.

In such the electric power steering apparatus, the control unit 30 mainly comprises a CPU (including an MPU, an MCU and so on), and general functions performed by programs within the CPU are shown in FIG. 2.

As shown in FIG. 2, the steering torque Ts detected by the torque sensor 10 and the vehicle speed Vs detected by the vehicle speed sensor 12 are inputted into a current command value calculating section 31. The current command value calculating section 31 calculates a current command value Iref1, based on the steering torque Ts and the vehicle speed Vs with reference to an assist map, which is a control target value of a current supplied to the motor 20. The calculated current command value Iref1 is inputted into a current limiting section 33 via an adding section 32A, the current command value Irefm that is limited the maximum current in the current limiting section 33, is inputted into a subtracting section 32B. A deviation I (=Irefm−Im) between the current command value Irefm and a motor current value Im which is fed-back is calculated in the subtracting section 32B, and the deviation I is inputted into a PI-control section 35 for improving a current characteristic of the steering operation. The voltage control command value Vref that the characteristic is improved in the PI-control section 35, is inputted into a PWM-control section 36, and the motor 20 is PWM-driven through an inverter 37 serving as a driving section. The motor current value Im of the motor 20 is detected by a motor current detector 38 and is fed-back to the subtracting section 32B.

A compensation signal CM from a compensation signal generating section 34 is added at the adding section 32A. A characteristic compensation of the steering system is performed by adding the compensation signal CM, and then a convergence, an inertia property and so on are improved. The compensating section 34 adds a self-aligning torque (SAT) 34-3 with an inertia 34-2 at an adding section 34-4, further adds the result of addition performed at the adding section 34-4 with a convergence 34-1 at an adding section 34-5, and then outputs the result of addition performed at the adding section 34-5 as the compensation signal CM. Any of the convergence 34-1, the inertia 34-2 and the self-aligning torque (SAT) 34-3 uses a motor angular speed as a calculation factor.

In the conventional electric power steering apparatus described above, the torque assist control sets the assist torque based on the torque detected by the torque sensor, and in addition performs a friction compensation and an inertia compensation by means of the angular speed of the motor. Further, the conventional electric power steering apparatus includes various compensators and control functions of a superior (vehicle) requirement in order to satisfy respective functions. The result affected with the various compensators or the like returns to a driver as a torsional torque of the torsion bar. Therefore, the more functions increase, the more control design is complicated, and a high technique is required to tune the feeling. Furthermore, the conventional electric power steering apparatus is a control structure that the feeling easily varies dependent on a secular variation of the friction in the mechanical portion and dispersions of the individual units.

The electric power steering apparatus for resolving the above problems are disclosed as follows. For example, in Japanese Unexamined Patent Application Publication No. 2002-160653 A (Patent Document 1), a target value (a torsion bar torque) is set by calculating a vehicle reaction force and a road-surface information (a friction coefficient), and the control is performed based on the deviation between the target value and the actual torque. Further, in Japanese Unexamined Patent Application Publication No. 2004-203089 A (Patent Document 2), a target value (a torsion bar torque) is set and the control is performed based on the deviation between the target value and the actual torque. Furthermore, in Japanese Unexamined Patent Application Publication No. 2009-57017 A (Patent Document 3), a steering motor is controlled with angle information of an upper-side and a lower-side of the torsion bar.

In the engagement of the worm and the worm wheel which constitutes the conventional reduction mechanism, a teeth rattling sound occurs if a gap (backlash) exists. Further, when the gap is too small, the friction torque increases and the feeling near the neutral position of the handle is deteriorated. Consequently, it is necessary for the backlash control to control the parts precisely and also assemble the parts accurately. To resolve this problem, the mechanism to suppress the backlash by applied a preload pressure using a spring, a rubber or the like and does not raise the friction, is proposed (Japanese Patent No. 4196831 B1 (Patent Document 4)).

THE LIST OF PRIOR ART DOCUMENTS

Patent Documents

Patent Document 1: Japanese Unexamined Patent Application Publication No. 2002-160653 A
Patent Document 2: Japanese Unexamined Patent Application Publication No. 2004-203089 A
Patent Document 3: Japanese Unexamined Patent Application Publication No. 2009-57017 A
Patent Document 4: Japanese Patent No. 4196831 B1

SUMMARY OF THE INVENTION

Problems to be Solved by the Invention

The present invention has been developed in view of the above-described circumstances, and an object of the present invention is to provide a method for controlling an electric power steering apparatus, the electric power steering apparatus and a vehicle equipped with the same. The method is designed such that individual compensation sections for friction compensation or the like are not required, a secular variation or the like in mechanical portions can be compensated by a feedback control of an angle follow-up control, the feeling designed by a target angle calculating section can be realized at all times, an improvement in the on-center feeling can be easily realized in particular, and an influence of a functional addition or the like on another functions or a stability is clarified.

Means for Solving the Problems

The present invention sets an angle target value (an upper-side or a lower-side of a torsion bar) and performs an angle control based on a deviation between the angle target value and an actual angle.

The present invention relates to a method for controlling an electric power steering apparatus, the above-described object of the present invention is achieved by that comprising the steps of: detecting an upper-side angle of a torsion bar; detecting a lower-side angle of the torsion bar; setting an angle target value of an opposite side by using one of the upper-side angle or the lower-side angle; detecting an actual angle of the opposite side; and performing an angle follow-up feedback control based on a deviation between the angle target value and the actual angle.

Further, the present invention relates to an electric power steering apparatus that assist-controls a steering system by driving a motor based on a current command value, the above-described object of the present invention is achieved by that comprising: a first angle sensor to detect an upper-side angle of a torsion bar; a second angle sensor to detect a lower-side angle of the torsion bar; a target angle calculating section to set an angle target value by using one of the upper-side angle of the torsion bar, or the lower-side angle of the torsion bar, a motor current and a vehicle information; and an angle follow-up control section to perform an angle follow-up control based on a deviation between the angle target value and an actual angle, wherein the current command value is calculated by the target angle calculating section and the angle follow-up control section.

Furthermore, the present invention relates to an electric power steering apparatus that assist-controls a steering system with engagement of a worm and a worm wheel by driving a motor based on a current command value, the above-described object of the present invention is achieved by that comprising: a first angle sensor to detect an upper-side angle of a torsion bar; a second angle sensor to detect a lower-side angle of the torsion bar; a target angle calculating section to set an angle target value by using one of the upper-side angle of the torsion bar or the lower-side angle of the torsion bar, a motor current and a vehicle information; and an angle follow-up control section to perform an angle follow-up control based on a deviation between the angle target value and an actual angle, wherein the current command value is calculated by the target angle calculating section and the angle follow-up control section, and an engagement gap of the worm and the worm wheel is zero or minus.

Effect of the Invention

According to the present invention, since the assist-control of the electric power steering apparatus is separated into the target angle calculating section to perform the item on feeling and the angle follow-up control section to perform the responsibility, the stability and the external disturbance suppression, the individual compensation sections such as the friction compensation are not necessary, the compensation for the secular variation of the mechanical portion is performed by the feedback control of the angle follow-up control, and it is possible to always maintain the feeling of the target angle calculated in the target angle calculating section. As a result, it is possible to easily realize an improvement of the on-center feeling, and the influence on another function due to a functional addition or the like and a stability becomes clear because the assist-control is separated into the target angle calculating section and the angle follow-up control section.

Further, since the electric power steering apparatus according to the present invention includes the angle follow-up control section, the position control can perform as it is without newly providing the position control section against the position command from the superior (vehicle) even in the automatic operation which is marked as a future technology.

Furthermore, because the structure in the hardware structure of the reduction mechanism under the conventional EPS control is that the friction between the worm and the worm wheel raises and the inertia of the motor readily travels to the driver, the preload pressure mechanism using a spring or the rubber damper is required for the protection. However, according to the present invention, since the compensations of the friction and the inertia can be compensated with the angle follow-up control regardless of the dispersions of the parts or the like, the driver does not feel uncomfortable. The target feeling is realized by the combination of the control structure and the hardware structure of the reduction mechanism according to the present invention.

MODE FOR CARRYING OUT THE INVENTION

In the present invention, an assist-control of an electric power steering apparatus is separated into a target angle calculating section which is affected to a feeling of a driver and an angle follow-up control section which is affected to a responsibility, a stability and an external disturbance suppression. An item on the feeling is performed by the target angle calculating section, and the responsibility, the stability and the external disturbance suppression are performed by the angle follow-up control section. In this connection, there is no necessity to provide individual compensating section such as a friction compensation, an inertia compensation or the like, the compensation for the secular variation of the mechanical portion is performed by the feedback control of the angle follow-up control, and it is possible to always maintain the feeling of the target angle calculated in the target angle calculating section. Further, it is possible to easily realize an improvement of an on-center feeling, and influences of another function due to a functional addition or the like and a stability become clear.

Further, in the present invention, an engagement gap (backlash) of a worm and a worm wheel is set to zero or minus in a hardware structure of a reduction mechanism, and the degree of freedom other than a rotational direction does not almost exist by fixing the worm rigidly. Therefore, a teeth rattling sound does not occur, it is possible to raise rigidity from a motor output angle to a lower-side angle of a torsion bar and to realize a hardware mechanism to readily control. In this connection, the hardware mechanism can contribute to an improvement in performance of the angle follow-up control, and an improvement in the feeling is desired.

Hereinafter, embodiments according to the present invention will be described with reference to the accompanying drawings.

Figure 3:
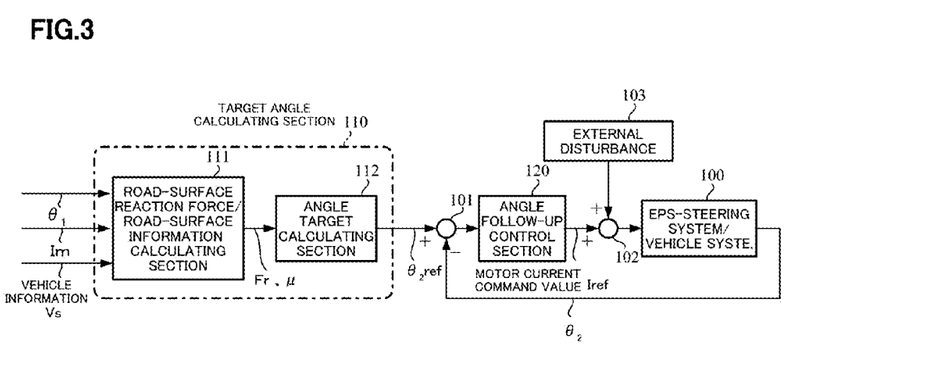
FIG. 3 is a block diagram of an exemplary structure according to the embodiment of the present invention.

FIG. 3 is a block diagram showing an embodiment of the present invention, and a control section to perform an assist-control is separated into a target angle calculating section 110 and an angle follow-up control section 120. An item on a feeling is performed by the target angle calculating section 110, and a control of a responsibility, a stability and an external disturbance suppression is performed by the angle follow-up control section 120. The target angle calculating section 110 comprises a road-surface reaction force/road-surface information calculating section 111 and an angle target calculating section 112. The road-surface reaction force/road-surface information calculating section 111 calculates a road-surface reaction force Fr and a road-surface information (a friction coefficient) μ based on a handle angle $\theta_1$ detected by an upper-side angle sensor, a motor current Im detected by a current detector and a vehicle speed Vs serving as a vehicle information. The angle target calculating section 112 calculates an angle target value $\theta_{2ref}$ based on the road-surface reaction force Fr and the road-surface information (the friction coefficient) μ. In a case of setting a torque (a torsion bar torque) to feel for hands, the angle target value $\theta_{2ref}$ is calculated by using the handle angle $\theta_1$ and a spring constant Kt of a torsion bar. The angle follow-up control section 120 is an actual angle feedback control to control based on a deviation between the angle target value $\theta_{2ref}$ obtained at a subtracting section 101 and an actual angle $\theta_2$ detected by an EPS-steering system/vehicle system 100, and a motor current command value Iref obtained in the angle follow-up control section 120 is inputted into an adding section 102. External disturbance 103 is also inputted into the adding section 102, and the addition result is inputted into the EPS-steering system/vehicle system 100 and then the electric power steering apparatus performs the assist-control.

Figure 4:
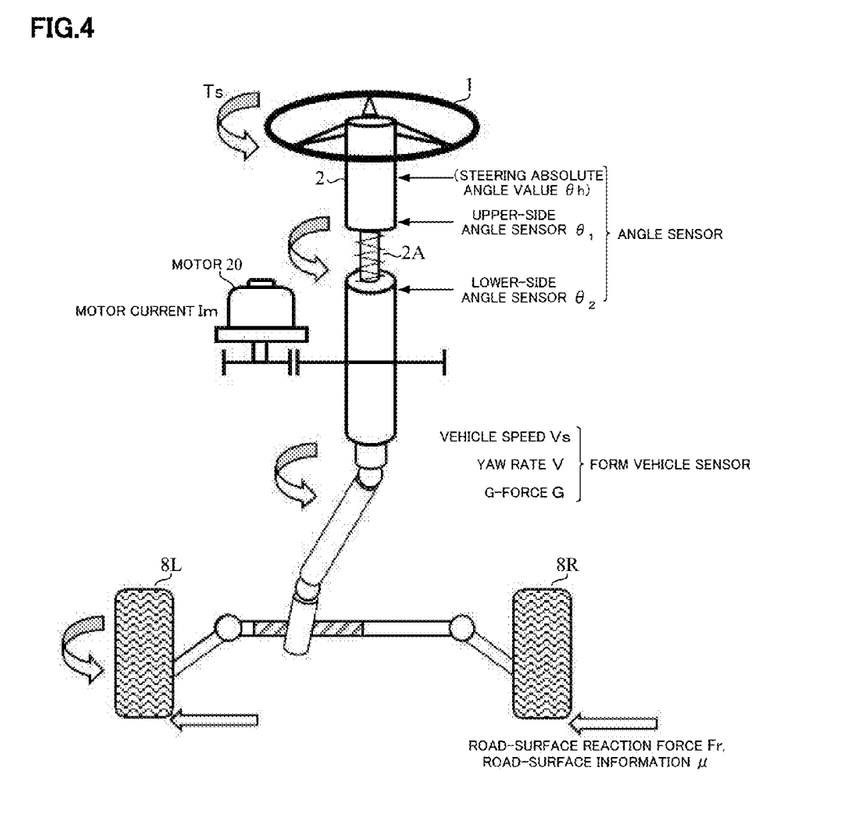
FIG. 4 is a structural diagram showing an example of EPS-steering system and sensors according to the embodiment of the present invention.

FIG. 4 is a structural diagram of the EPS-steering system and a mounting example of various sensors according to the embodiment of the present invention, and the road-surface reaction force Fr and the road-surface information μ act to the steered wheels 8L and 8R. The upper-side angle sensor (angle $\theta_1$) is provided to a handle side of a column shaft 2 having a torsion bar 2A, and a lower-side angle senor (angle $\theta_2$) is provided to the steered wheels side of the column shaft 2. Any resolution of the upper-side and lower angle sensors is 0.02° or less, and the motor current Im of the motor 20 is detected by the current detector.

Figure 5:
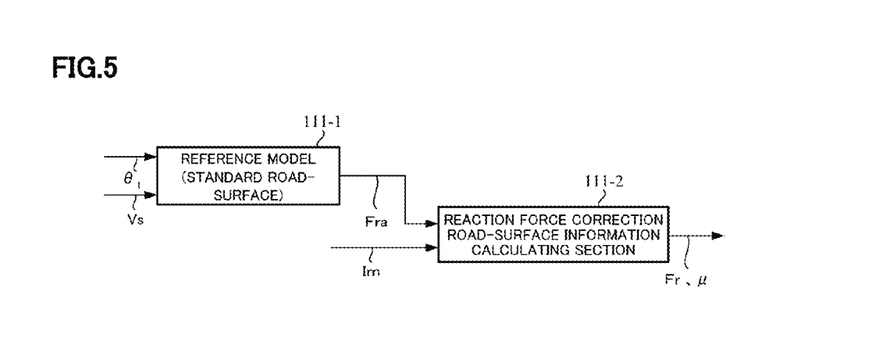
FIG. 5 is a block diagram showing an example structure of road-surface reaction force and road-surface information calculating section.

FIG. 5 is a block diagram showing the structure of the road-surface reaction force/road-surface information calculating section 111, and a road-surface reaction force Fra of a reference model (a standard road-surface) 111-1 is calculated by using the angle $\theta_1$ ($\approx$ the handle angle) of the upper-side angle sensor of the torsion bar 2A and the vehicle speed $V_s$. At this time, a reference motor current is also calculated. Then, by comparing the reference motor current with the actual motor current Im, a reaction force correction road-surface information calculating section 111-2 corrects the road-surface reaction force Fra and calculates the road-surface information (the friction coefficient) μ. As stated-above, the road-surface reaction force Fr and the road-surface information (the friction coefficient) μ can be calculated with a few number of information.

Further, by inputting a yaw rate V, a lateral acceleration (G-force) G, a sideslip angle or the like as the vehicle information into the reaction force correction road-surface information calculating section 111-2, the more precise road-surface reaction force Fr may be calculated. Furthermore, the road-surface reaction force Fr may directly be measured by using a tire sensor and a rack-axial force measuring sensor. By calculating the road-surface reaction force accurately, the road-surface information is appropriately transmitted to the driver.

Figure 6:
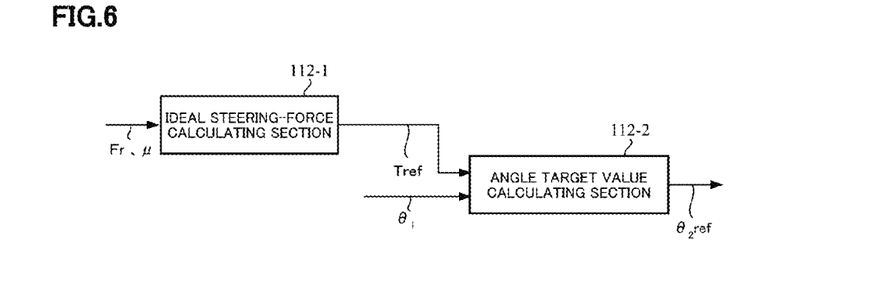
FIG. 6 is a block diagram showing an example structure of an angle target calculating section.

In addition, FIG. 6 is a block diagram showing a structure of the angle target calculating section 112, and the angle target calculating section 112 comprises an ideal steering-force calculating section 112-1 and an angle target value calculating section 112-2. The ideal steering-force calculating section 112-1 calculates an ideal steering torque Tref, which should be transmitted to the driver, based on the road-surface reaction force Fr and the road-surface information μ. The ideal steering torque Tref is inputted into the angle target value calculating section 112-2, and the angle target value $\theta_{2ref}$ is calculated in the angle target value calculating section 112-2 based on the information of the angle $\theta_1$ of the upper-side angle sensor.

As stated-above, in comparison to the conventional torque control, according to the present invention, the target angle calculating section 110 to perform an item which influences on the feeling and the angle follow-up control section 120 to perform items which influence on the responsibility, the stability or the like are separated. Consequently, by setting a band of the angle follow-up control section 120 to a required value (the responsibility, the external disturbance suppression or the like), the friction compensation and the inertia compensation which are individually set in the conventional apparatus, are not required. Further, since the secular variation or the like in mechanical portion is compensated by the feedback control of the angle follow-up control, the feeling calculated (designed) in the target angle calculating section 110 is always realized.

As a result, an improvement in the on-center feeling which is a technical problem up to this time and is difficult to be tuned, is easily realized. Since the target angle calculating section 110 and the angle follow-up control section 120 are separated, the influence on another function due to the functional addition and the stability becomes clear.

In addition, the electric power steering apparatus of the present invention does not decide the assist force from the detected torque as prior arts, and calculates the assist torque based on the road-surface information. Accordingly, the driver appropriately feels the road-surface reaction force Fr and the road-surface information μ.

In the torque target value control such as disclosed in Patent Document 1, the torque target value is set by using the handle angle sensor and the torque sensor. However, since the resolution of the handle angle sensor is normally about 0.1°, this resolution is too rough to generate the target value. Because the feeling does not change when the handle angle is within 0.1°, the driver feels uncomfortable. On the contrary, in the present invention, since the resolutions of two angle sensors provided by inclosing the torsion bar 2A are respectively 0.02° or less, it is possible to set more accurately the target value and to realize the control without uncomfortable. Further, because the apparatus of the present invention does not control the torque target value and performs the angle target value control, it is capable of performing as it is the position control, without newly providing the position control section, against the position command from the superior (vehicle) in the automatic operation which is marked as the future technology. Furthermore, since the target value is the lower-side angle of the torsion bar, it is possible to control with a value (in a state that the influence on the torsion of the torsion bar is excluded) near a cutting angle of the vehicle's tire.

Although the column EPS is described in the above embodiment according to the present invention, it is possible to apply to a pinion EPS, a dual pinion EPS and a ball-screw pinion EPS.

On the other hand, in the engagement of the worm and the worm wheel which constitute the conventional reduction mechanism, there are problems that the teeth rattling sound occurs if the gap (backlash) exists, and the friction torque increases and then the feeling near the handle neutral position is deteriorated when the gap is too small. Accordingly, it is necessary to control the parts precisely and assemble them accurately.

For the above problem, in the present invention, the engagement gap (backlash) of the worm and the worm wheel is set to zero or minus as the hardware structure of the reduction mechanism, and the degree of freedom other than a rotational direction does not almost exist by fixing the worm rigidly with the bearings. That is, a play of the worm support bearings does not almost exist and the degree of freedom other than the rotational direction of the worm is nearly zero.

By taking the above structure, it is possible to raise the rigidity from a motor output angle to the lower-side angle senor $\theta_2$ of the torsion bar and to realize the readily control hardware. Therefore, it is possible to contribute to the performance improvement of the angle follow-up control, and an improvement of the feeling is desired. Further, since the engagement gap of the worm and the worm wheel is set to zero or minus, the teeth rattling sound does not occur. Although there is no fear on the occurrence of the teeth rattling sound, the large friction is badly affected to the feeling. However, because the hardware constitutes the structure of the above separated control, the friction is compensated by the angle follow-up control and the improvement of the feeling is realized.

Figure 7:
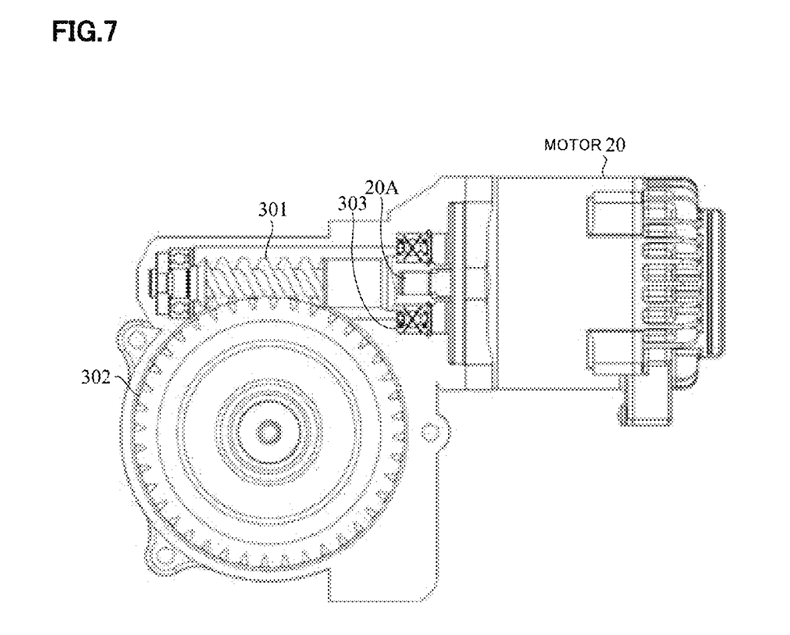
FIG. 7 is a cross-sectional view showing an example of a bearing structure of a reduction mechanism.
Figure 8:
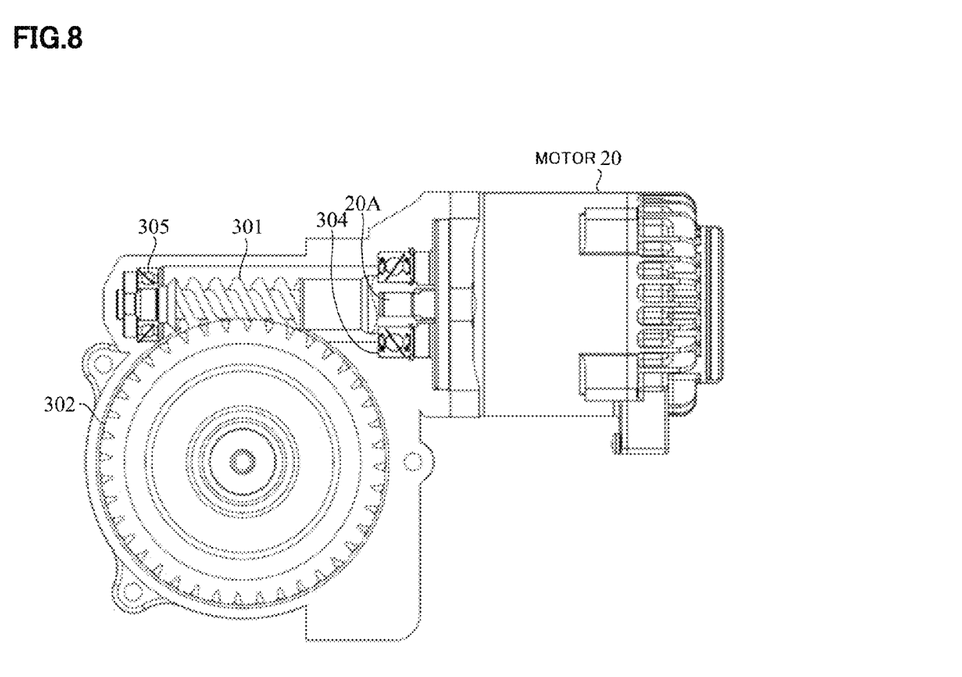
FIG. 8 is a cross-sectional view showing an example of a bearing structure of a reduction mechanism.

FIGS. 7 and 8 show examples of the bearing structure of the reduction mechanism. FIG. 7 illustrates "a deep groove ball bearing+a four-point contact ball bearing", and FIG. 8 does "a deep groove ball bearing+a deep groove ball bearing+a preload in the axial direction". In the bearing structure of FIG. 7, a load in the axial direction is supported by the four-point contact ball bearing 303 and an axial gap does not almost exist. Further, in the bearing structure of FIG. 8, the load in the axial direction is supported by the two ball bearings 304 and 305, and the bearings are fixed to the reduction mechanism in size such that the axial gap does not exist by means of the preload pressure. The preload pressure is performed by using a rigid body such as a retaining ring and a nut.

For the both examples, the worm 301 is rigidly fixed to the output shaft 20A of the motor 20 and the rubber damper does not exist in the axial direction. The worm 301 does not move in the axial direction and the degree of the freedom is only the rotational direction. Therefore, the rigidities in the axial and radial directions are high. Further, the worm wheel 302 is engaged with the worm 301, and the engagement gap is set to zero or minus.

As stated-above, since the worm 301 is rigidly fixed (the degree of the freedom is only the rotational direction) and the engagement gap (backlash) between the worm 301 and the worm wheel 302 does not exist, the mechanical rigidity from the output shaft 20A of the motor 20 to the lower-side angle senor of the torsion bar becomes high. Accordingly, the performance (the responsibility, the stability and so on) of the angle follow-up control is improved and the feeling is also improved. If the rubber damper and the spring preload pressure exist in the axial and radial directions, the rigidity from the motor output decreases due to the rubber and the responsibility is deteriorated. Then, the control design is restricted to this mechanical rigidity. It is concerned that the feel is deteriorated because of increases in the friction and the inertia according to the present structure. Since the overall control section is compensated by the improvement of the responsibility of the angle follow-up control, a more comfortable feeling is realized.

EXPLANATION OF REFERENCE NUMERALS 1 handle
2 column shaft (steering shaft, handle shaft)
3 reduction mechanism
10 torque sensor
12 vehicle speed sensor
14 steering angle sensor
20 motor
30 control unit (ECU)
100 EPS-steering system/vehicle system
110 target angle calculating section
111 road-surface reaction force/road-surface information calculating section
111-1 reference model (standard road-surface)
111-2 reaction force correction road-surface information calculating section
112 angle target calculating section
112-1 ideal steering-force calculating section
112-2 angle target value calculating section
120 angle follow-up control section

The invention claimed is:

1. A method for controlling an electric power steering apparatus comprising:
   detecting an upper-side angle of a torsion bar by a first angle sensor provided at a handle side of a column shaft of said electric power steering apparatus for said torsion bar;
   detecting a lower-side angle of said torsion bar by a second angle sensor provided at steered-wheels side of said column shaft of said electric power steering apparatus for said torsion bar;
   calculating a road-surface reaction force and a road-surface information based on said upper-side angle of said torsion bar, a motor current, and a vehicle information;
   calculating an angle target value based on said road-surface reaction force and said road-surface information;
   calculating a deviation between said angle target value and said lower-side angle of said torsion bar; and
   performing an angle follow-up feedback control based on said calculated deviation.

2. An electric power steering apparatus that assist-controls a steering system by driving a motor based on a current command value, comprising:
   a first angle sensor to detect an upper-side angle of a torsion bar, which is provided at a handle side of a column shaft of said electric power steering apparatus for said torsion bar;
   a second angle sensor to detect a lower-side angle of said torsion bar, which is provided at steered-wheels side of said column shaft of said electric power steering apparatus for said torsion bar; and
   an electronic control unit (ECU) which sets an angle target value by using said upper-side angle of said torsion bar, a motor current, and a vehicle information, calculates said current command value based on a deviation between said angle target value and said lower-side angle of said torsion bar, and performs an angle follow-up control by said current command value,
   wherein said ECU receives said upper-side angle of said torsion bar, said motor current, and said vehicle information and calculates a road-surface reaction force, a road-surface information, and said angle target value based on said road-surface reaction force and said road-surface information.

3. The electric power steering apparatus according to claim 2, wherein said ECU receives a reference model to calculate a road-surface reaction force of said reference model based on said upper-side angle of said torsion bar and said vehicle information, and calculates said road-surface reaction force and said road-surface information based on said road-surface reaction force of said reference model and said motor current.

4. The electric power steering apparatus according to claim 2, wherein said ECU calculates an ideal steering torque based on said road-surface reaction force and said road-surface information, and calculates said angle target value based on said upper-side angle of said torsion bar and said ideal steering torque.

5. The electric power steering apparatus according to claim 3, wherein said ECU calculates an ideal steering torque based on said road-surface reaction force and said road-surface information, and calculates said angle target value based on said upper-side angle of said torsion bar and said ideal steering torque.

6. The electric power steering apparatus according to claim 2, wherein resolutions of said first and second angle sensors are respectively 0.02° or less.

7. The electric power steering apparatus according to claim 3, wherein resolutions of said first and second angle sensors are respectively 0.02° or less.

8. The electric power steering apparatus according to claim 4, wherein resolutions of said first and second angle sensors are respectively 0.02° or less.

9. The electric power steering apparatus according to claim 5, wherein resolutions of said first and second angle sensors are respectively 0.02° or less.

10. An electric power steering apparatus that assist-controls a steering system with engagement of a worm and a worm wheel by driving a motor based on a current command value, comprising:

a first angle sensor to detect an upper-side angle of a torsion bar, which is provided at a handle side of a column shaft of said electric power steering apparatus for said torsion bar;

a second angle sensor to detect a lower-side angle of said torsion bar, which is provided at steered-wheels side of said column shaft of said electric power steering apparatus for said torsion bar; and an electronic control unit (ECU) which calculates a road-surface information by using said upper-side angle of said torsion bar, a motor current, and a vehicle speed, which further calculates an angle target value based on said road-surface reaction force and said road-surface information, and which further calculates said current command value based on a deviation between said angle target value and said lower-side angle of said torsion bar, and perform an angle follow-up control by said current command value, wherein an engagement gap of said worm and said worm wheel is zero or minus.

11. The electric power steering apparatus according to claim 10, wherein said worm is rigidly fixed in directions other than a rotational direction of a rotational shaft.

12. The electric power steering apparatus according to claim 10, wherein a support bearing of said worm is deep groove ball bearings and four-point-contact ball bearings.

13. The electric power steering apparatus according to claim 11, wherein a support bearing of said worm is deep groove ball bearings and four-point-contact ball bearings.

14. The electric power steering apparatus according to claim 10, wherein a support bearing of said worm comprises two deep groove ball bearings, and a play of said deep groove ball bearings is zero or minus by preload in an axial direction using a rigid body at a time of assembling.

15. The electric power steering apparatus according to claim 11, wherein a support bearing of said worm comprises two deep groove ball bearings, and a play of said deep groove ball bearings is zero or minus by preload in an axial direction using a rigid body at a time of assembling.

16. A vehicle equipped with said electric power steering apparatus according to claim 2.

17. A vehicle equipped with said electric power steering apparatus according to claim 10.

* * * * *